United States Patent
Ferdolage

(10) Patent No.: US 7,069,632 B2
(45) Date of Patent: Jul. 4, 2006

(54) COAXIAL AND CONCENTRIC CUTTING MACHINE AND A METHOD FOR USE THEREOF

(76) Inventor: Richard D. Ferdolage, 313 High St., San Luis Obispo, CA (US) 93401

( * ) Notice: Subject to any disclaimer, the term of this patent is extended or adjusted under 35 U.S.C. 154(b) by 240 days.

(21) Appl. No.: 10/770,901

(22) Filed: Feb. 2, 2004

(65) Prior Publication Data

US 2005/0166376 A1    Aug. 4, 2005

(51) Int. Cl.
B23P 23/00        (2006.01)

(52) U.S. Cl. ............... 29/27 A; 29/27 C; 142/26; 142/48; 142/55; 142/56; 82/122; 144/3.1; 144/48

(58) Field of Classification Search ......... 29/27 A, 29/27 C, 27 R, 560; 142/1, 26, 40, 47–49, 142/55; 82/137, 152, 148, 158, 122; 144/376–377, 144/3.1, 48; 83/326, 788
See application file for complete search history.

(56) References Cited

U.S. PATENT DOCUMENTS

| | | | | |
|---|---|---|---|---|
| 2,226,029 A | * | 12/1940 | Taylor | 29/27 A |
| 2,395,586 A | * | 2/1946 | Scott | 82/137 |
| 3,003,295 A | * | 10/1961 | Harvey | 451/435 |
| 3,695,316 A | | 10/1972 | Pluckhahn | |
| 3,828,487 A | * | 8/1974 | Mitchell | 451/435 |
| 4,067,368 A | | 1/1978 | Beecroft | |
| 4,104,944 A | | 8/1978 | Janssen | |
| 4,122,604 A | | 10/1978 | Brown | |
| 4,272,889 A | | 6/1981 | Scott et al. | |
| 4,353,399 A | * | 10/1982 | Harris | 144/2.1 |
| 4,527,602 A | * | 7/1985 | Martin | 142/55 |
| 4,566,169 A | * | 1/1986 | Vesely | 29/27 A |
| 4,726,274 A | * | 2/1988 | Pitoni et al. | 83/798 |
| 4,848,422 A | * | 7/1989 | Chiantella | 142/49 |
| 4,850,407 A | | 7/1989 | Inkster | |
| 5,090,287 A | * | 2/1992 | Chezem | 83/838 |
| 5,243,892 A | | 9/1993 | Jindra | |
| 5,351,376 A | * | 10/1994 | Kitamura | 29/27 C |
| 6,007,279 A | | 12/1999 | Malone | |
| 6,021,826 A | | 2/2000 | Daniell | |
| 6,102,089 A | | 8/2000 | McCormick | |
| 6,565,294 B1 | | 5/2003 | Young | |
| 6,796,012 B1 | * | 9/2004 | Geissler et al. | 29/27 A |
| 2002/0076287 A1 | * | 6/2002 | Glaspie | 409/262 |
| 2002/0153059 A1 | | 10/2002 | Cassady | |

* cited by examiner

FOREIGN PATENT DOCUMENTS

GB          2253587 A   *   9/1992

*Primary Examiner*—Erica Cadugan
(74) *Attorney, Agent, or Firm*—Philip Steiner, Esq.

(57) ABSTRACT

A concentric coaxial cutting machine which cuts cylinders, cylindroids or cones using a chain saw from a single larger object such as a wood tree trunk, a block of ice or a block of plastic. An embodiment of the invention comprises a transverse support member having directly or indirectly mounted thereon; a headstock member including; a headstock spindle member mounted to said headstock member including; a drive spindle rotationally mounted to said headstock spindle member and adapted to rotationally retain one end of an object to be centrically cut; a tailstock member including; a tailstock spindle member mounted to said tailstock member including; a tailstock spindle rotationally mounted to said tailstock spindle member and adapted to retain an opposite end of the object; a drive assembly in rotational communication with the drive spindle and adapted to rotate said drive spindle around a common axis with said tailstock spindle; and, a first chain saw variably aligned at an angle to said common axis and adapted to concentrically cut the object from at least the opposite end.

25 Claims, 9 Drawing Sheets

COAXIAL AND CONCENTRIC CUTTING MACHINE AND A METHOD FOR USE THEREOF

FIELD OF INVENTION

The present invention relates generally to a cutting machine and more specifically to a cutting machine adapted to concentrically and coaxially cut multiple cylinders or cylindroids from a single larger object such as wood trunk, a block of ice, a block of plastic or other materials.

BACKGROUND

A variety of mechanisms are known in the relevant art for cutting larger objects made of wood, plastic or ice. These larger objects are readily cut from the exterior by many common hand or power tools from virtually any desired angle. For example, U.S. Pat. No. 3,695,316 to Plickhahn, discloses a wood cutting rig which incorporates the use of a chain saw. The wood cutting rig is used to support the chain saw during production of wood timbers from wood logs. U.S. Pat. No. 4,272,889 to Scott et al., discloses a chain saw having a vertically mounted cutting assembly. U.S. Pat. No. 4,353,399 to Harris, discloses another woodcutting rig which may be used to support a chain saw; U.S. Pat. No. 5,243,892 to Jindra, discloses another woodcutting rig and chain saw arrangement; and U.S. patent application Ser. No. 2002/0153059 to Cassady, discloses yet another woodcutting rig which incorporates a hand type wood grinder. However, none of these cutting rigs or power tools is well suited for concentrically cutting coaxially derived cylinders or cylindroids from larger objects made of wood, plastic or ice.

Currently, the only way to produce cylinders or cylindroids from these larger objects requires boring out of the object which wastes much of the unused object. Secondly, boring or other routing mechanisms do not allow for cutting coaxially derived cylinders or cylindroids from these objects.

In many situations, a single source of material is highly desirable for both aesthetic and utilitarian reasons.

For example, concentrically and coaxially cut cylinders or cylindroids of wood are highly desirable in the music industry in the making of percussion instruments such as drums as the use of wood having nearly identical acoustic characteristics produces superior sounds over similar synthetically constructed musical instruments. The superior acoustical characteristics of wood are one of the main reasons why musical instruments constructed from wood command premium prices over similar synthetically constructed musical instruments.

From an aesthetic perspective, the uniform natural wood grain derived from the coaxially cut cylinders or cylindroids provide considerable visual aesthetic appeal to both musicians and there viewing audience alike when incorporated into a family of percussion instruments such as a drum set. Likewise, furniture constructed from a single source of wood is generally more visually appealing as there is more uniformity in color and wood grain direction.

Thusly, for the reasons previously stated, it would be highly desirable to provide a cutting machine which allows for cutting coaxially derived cylinders or cylindroids from larger feedstock objects made of wood, ice or plastic while minimizing waste of the original feedstock.

SUMMARY

This invention addresses the limitations described above and provides in various embodiments of the invention a machine which allows coaxial, concentric cutting of an object to produce various cylinders or cylindroids from a common source object. In one embodiment, the invention comprises a longitudinal support member, a transverse support member coupled to the longitudinal support member. The transverse support member including a headstock member. The headstock member includes a headstock spindle member coupled to the headstock member. The headstock member includes a drive spindle rotationally coupled to the headstock spindle member and aligned to rotationally retain one end of an object to be concentrically cut. The invention further includes a tailstock member having a tailstock spindle member mounted to the tailstock member.

The tailstock spindle member includes a tailstock spindle rotationally coupled to the tallstock spindle member and aligned to retain an opposite end of the object. A drive assembly in rotational communication with the drive spindle is provided to rotate the drive spindle around a common rotational axis with the tailstock spindle. In an embodiment of the invention, the drive assembly comprises a variable speed electric motor having a shaft-mounted pulley which drives a second pulley mounted on the drive spindle by a belt.

A first chain saw is provided to concentrically cut the object from an end. The chain saw is variably aligned at an angle to the common rotational axis. In various embodiments of the invention the headstock member, tailstock member, tailstock spindle member and first chain saw are repositionable about a long dimension of the transverse support member. Related embodiments of the invention provide for the tailstock spindle member and first chain saw to be repositionable perpendicular to the transverse support member.

In a related embodiment of the invention, an accessory table is coupled to the longitudinal support member. The accessory table allows additional cutting, roughing or finishing equipment to engage the object.

In another embodiment of the invention, the concentric coaxial cutting machine is configured such that the longitudinal support member comprises an elongated conduit in which the headstock member forms a transverse base coupled to one end of the elongated conduit. The headstock spindle member comprises a rotary table coupled to the transverse base in which the drive spindle is centered. The rotary table may be provided with a plurality of T-slots and an attachable multi-jawed chuck.

In a related embodiment of the invention, the tailstock member comprises a repositionable transverse arm coupled to an opposite end of the elongated conduit.

The tallstock member is longitudinally repositionable along a substantial length of the elongated conduit and rotationally repositionable about a radius of the elongated conduit. A clamp is mounted to a bottom of the tailstock member to securely maintain the tailstock member in a desired position.

In various embodiments of the invention, both the first chain saw and tailstock spindle member are coupled to the transverse arm of the tailstock member. This allows either or both the first chain saw and tailstock spindle member to be further repositionable by adjustment of a set of jackscrew drives. In various related embodiments of the invention, the first chain saw is replaceable with another cutting, grinding or finishing tool and/or may be pivotally coupled to the transverse arm such that the chain of the chain saw engages the object at an angle to the common rotational axis.

In a horizontally oriented embodiment of the invention, the concentric coaxial cutting machine is configured similar to a large horizontal lath. In this horizontal embodiment of the invention, the transverse support member comprises a pair of horizontal rails aligned in parallel and secured to each other by a plurality of periodically spaced perpendicular cross members.

In this horizontally embodiment of the invention, a pair of traveling tool arms aligned in opposition is slidably mounted on one of the horizontal rails while the headstock member and the tailstock member are slidably mounted on the other horizontal rail. The first chain saw is variably mounted to one traveling tool arm member while an optional second chain saw may be variably mounted to the other traveling tool arm member. Both chain saws are variably aligned at the angle to the common rotational axis but in opposition to each other.

Lastly, an optional pair of roller support members are slidably mounted to the first and second horizontal rails in opposition to each other and are intended to support the object at least when the object is being concentrically cut.

In another embodiment of the invention, a method for using The concentric coaxial cutting machine is provided which comprises the steps of: securing the object between a drive spindle means and a tailstock spindle means, activating a drive assembly means, aligning a first chain saw means to a desired concentric cutting angle, positioning the first chain saw means to a desired concentric cutting location on the object, activating the first chain saw means, and concentrically cutting the object. Certain of these steps may be repeated to make additional concentric cuts in one end of the object. Likewise, the object may be repositioned 180 degrees to allow additional cuts to be made in the opposite end of the object.

BRIEF DESCRIPTION OF DRAWINGS

The features and advantages of the invention will become apparent from the following detailed description when considered in conjunction with the accompanying drawings. Where possible, the same reference numerals and characters are used to denote like features, elements, components or portions of the invention. It is intended that changes and modifications can be made to the described embodiments without departing from the true scope and spirit of the subject invention as defined in the claims.

DETAILED DESCRIPTION

This present invention provides a cutting machine which produces concentrically and/or coaxially cut cylinders or cylindroids from a single larger object such as wood trunk, a block of ice, a block of plastic or equivalent material.

Figure 1:
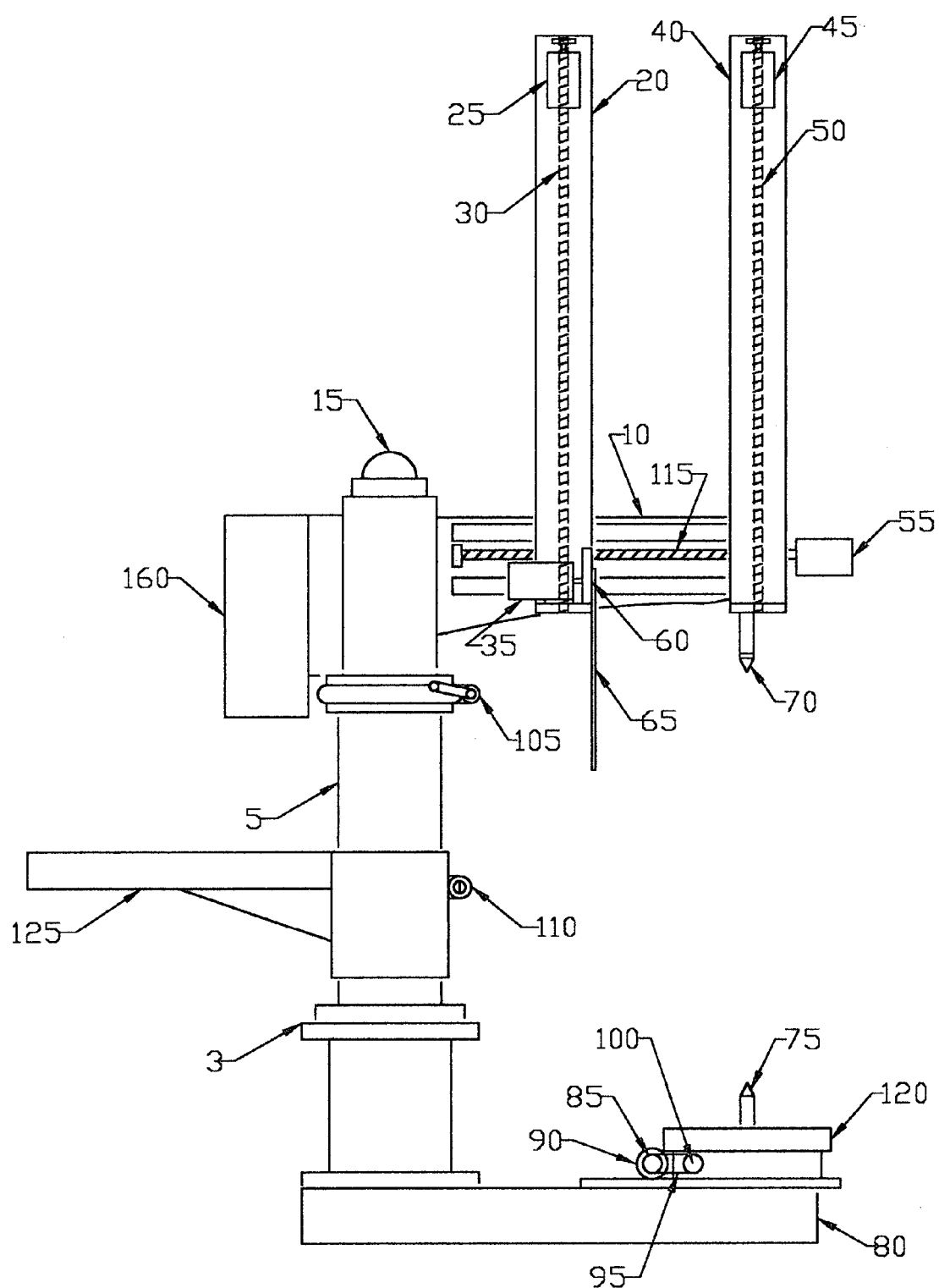
FIG. 1—is a frontal view of a vertically oriented embodiment of the invention.

Referring to FIG. 1, a vertically oriented embodiment of the invention is shown. The vertically oriented embodiment of the invention resembles a large industrial drill press and is constructed of typical industrial strength metals. This embodiment of the invention comprises a horizontal base assembly 80, a vertical conduit 5 mounted on one end of the horizontal base assembly 80 and a horizontal tool arm assembly 10 mounted on an opposite end 15 of the vertical conduit 5. The horizontal base assembly 80 has mounted thereupon, a rotary table 120 arranged in opposition to the horizontal tool arm assembly 10 and radially displaced from the vertical conduit 5. In an embodiment of the invention, the rotary drive table 120 is horizontally repositionable outward from the vertical conduit 5 along a centerline of the horizontal base assembly 80. The rotary table 120 includes a centered drive spindle 75 arranged in opposition to the horizontal tool arm 10.

The rotary table 120 is driven by a variable speed electric motor 90 coupled to the rotary table 120 by a belt 95 and pulley system 85, 100. The belt 95 and pulley system 85,100 and variable speed electric motor 90 are adapted to rotate the drive table 120 in a range of 0–300 RPM. Alternately, a gear and chain drive system will work as well. The vertical conduit 5 includes a horizontally aligned accessory table 125, which is both vertically and radially repositionable about the long dimension of the vertical conduit 5. A vertical travel stop 3 may be provided on a lower portion of the vertical conduit 5 to prevent either the accessory table 125 or the horizontal tool arm assembly 10 from being positioned in an unsafe manner. The accessory table 125 is securely locked into position with a hand-operated compressive type clamp 110. The hand-operated compressive type clamp 110 compressively engages the outer circumference of the vertical conduit 5. The accessory table 125 provides support for additional cutting, grinding or finishing tools.

The horizontal tool arm assembly 10 is likewise vertically and radially repositionable about the long dimension of the vertical conduit 5 and is held in position by a second hand operated compressive type clamp 105 mounted at the bottom of the horizontal tool arm assembly 10. The second hand operated compressive type clamp 105 compressively engages the outer circumference of the vertical conduit 5 as well. An electrical motor control center 160 may be attached to the end of the vertical conduit 5 in closest proximity to the horizontal tool arm assembly 10. One skilled in art will appreciate that the electrical motor control center 160 may be position elsewhere as well.

The horizontal tool arm assembly 10 has mounted thereon, a vertical cutting assembly 20 and a tailstock spindle assembly 40. Both assemblies 20, 40 are vertically aligned in opposition to the horizontal base assembly 80. The cutting assembly 20 includes an electrically powered chain saw 35 attached to the bottom end of the cutting assembly 20 by a bracket 60.

The chain saw blade assembly 65 of the chain saw 35 is aligned in opposition to the horizontal base assembly 80. In an embodiment of the invention, the chain saw 35 is vertically repositionable by an electrically driven gear motor 25, which turns a vertically oriented jackscrew 30 in which the chain saw 35 is coupled. In another embodiment of the invention, the chain saw 35 is manually repositioned. A suitable electric chain saw is available from Logosol, Inc., P.O. Box 660, Madison, Miss. 39130; www.logosol.com.

The tailstock spindle assembly 40 includes a tailstock spindle 70 aligned in opposition to the drive spindle 75. The space between the tailstock spindle 70 and the drive spindle 75 containing an object to be concentrically cut by the chain saw 35. The object (shown in FIG. 3) 140 is held in position by impaling the ends of the object to be cut with the drive spindle 75 and tailstock spindle 70. The weight of the object 140 is supported by the rotary table 120. In one embodiment of the invention, the tailstock spindle 70 is likewise vertically repositionable by a second electrically driven gear motor 45, which turns a second vertically oriented jackscrew 50 in which the tailstock spindle 70 is coupled. In another embodiment of the invention, the tailstock spindle 70 may be manually repositioned.

In another embodiment of the invention, both the cutting assembly 20 and the tailstock assembly 40 are horizontally repositionable by a third electrically driven gear motor 55 which turns a third jackscrew 115 horizontally installed within the horizontal tool arm assembly 10. One skilled in the art will appreciate that various mechanisms (manual or automated) for repositioning of the cutting and tailstock spindle assemblies 20, 40 may be incorporated into the invention.

Figure 2:
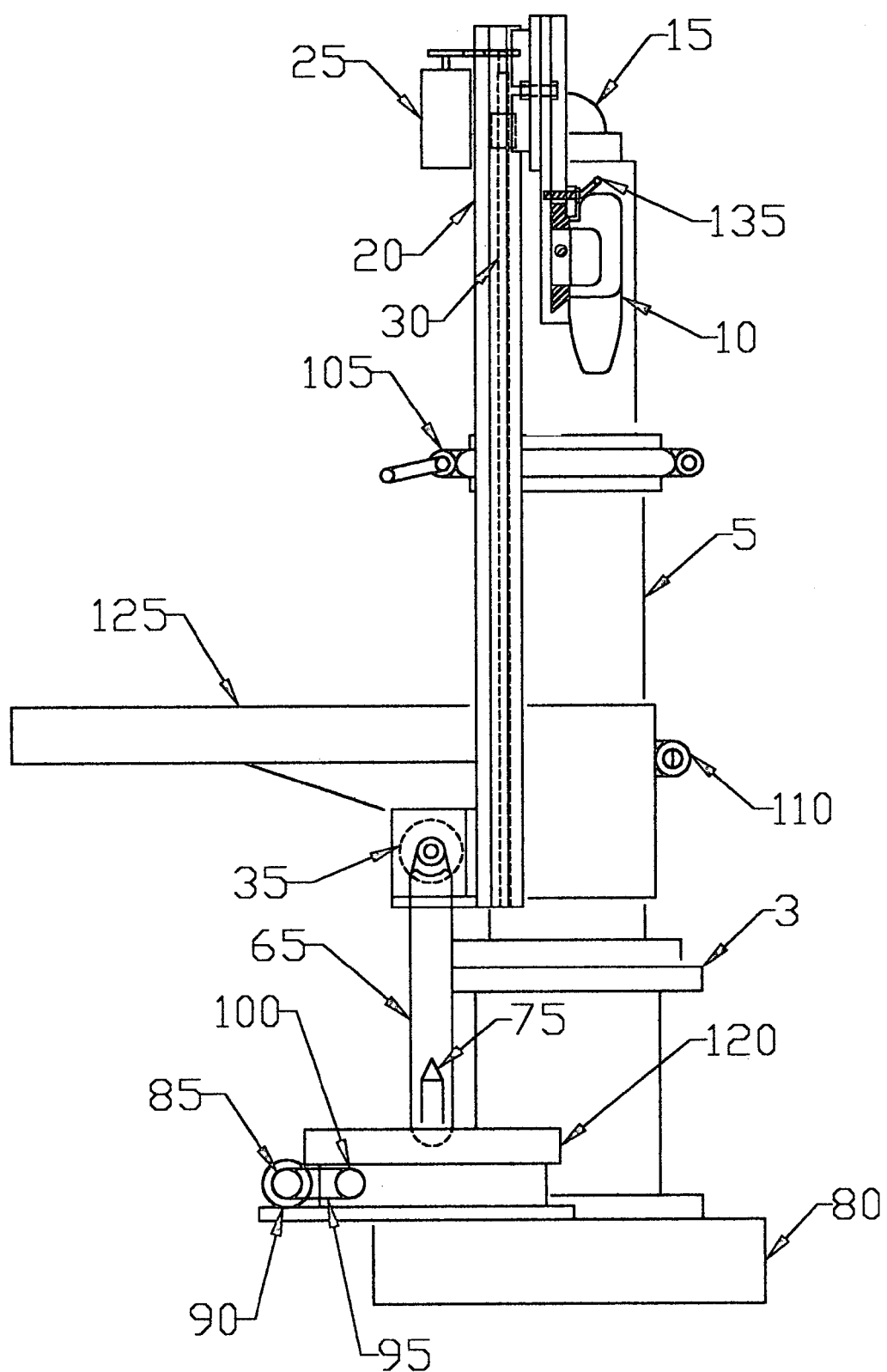
FIG. 2—is a side view of the vertically oriented embodiment of the invention.

Referring to FIG. 2, an extravagated side view of the vertical embodiment of the invention is shown. This side view of the invention illustrates the vertical travel of the chain saw 35 in relation to the horizontal base assembly 80. A third clamp 135 is provided on the horizontal tool assembly 10 to securely lock the cutting assembly 20 in a cutting position.

In this embodiment of the invention, the chain saw 35 is shown at its maximum extent of travel provided by the electrically driven gear motor 25 and jackscrew 30. An equivalent arrangement is provided for the tailstock spindle assembly 40 (not shown). A side view of some of the major components described in FIG. 1 is shown as well.

Figure 3:
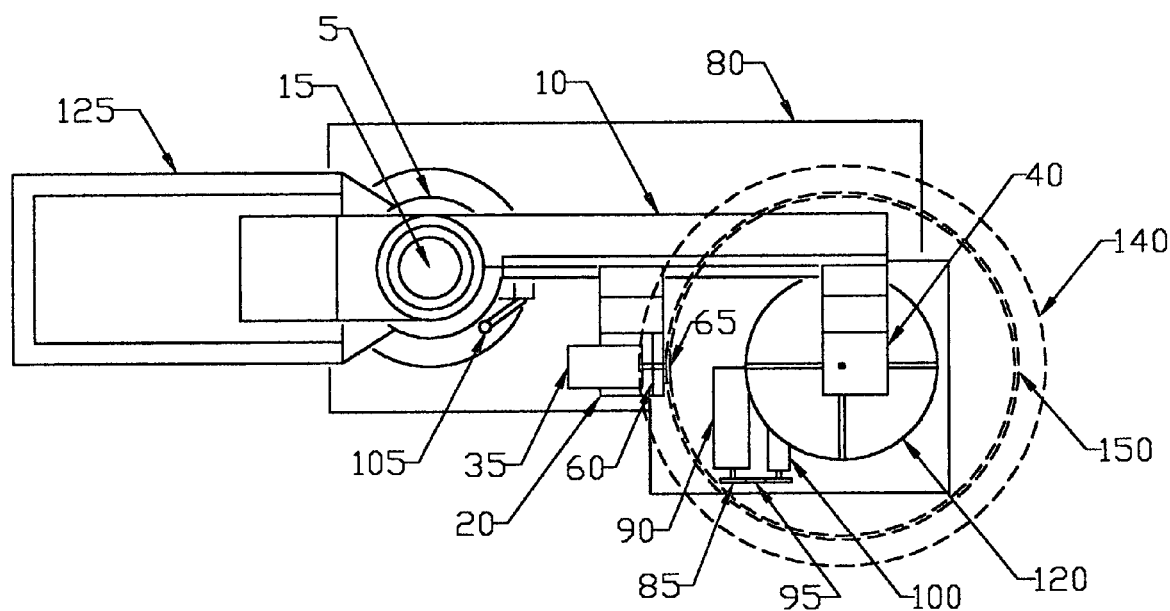
FIG. 3—is a top view of the vertically oriented embodiment of the invention.

Referring to FIG. 3, a top view of the vertical embodiment of the invention is shown. This top view illustrates positioning of the accessory table 125 during main cutting operations and an object 140 being concentrically cut 150 by the chain saw blade assembly 65. A top view of some of the major components described in FIG. 1 is shown as well.

Figure 4:
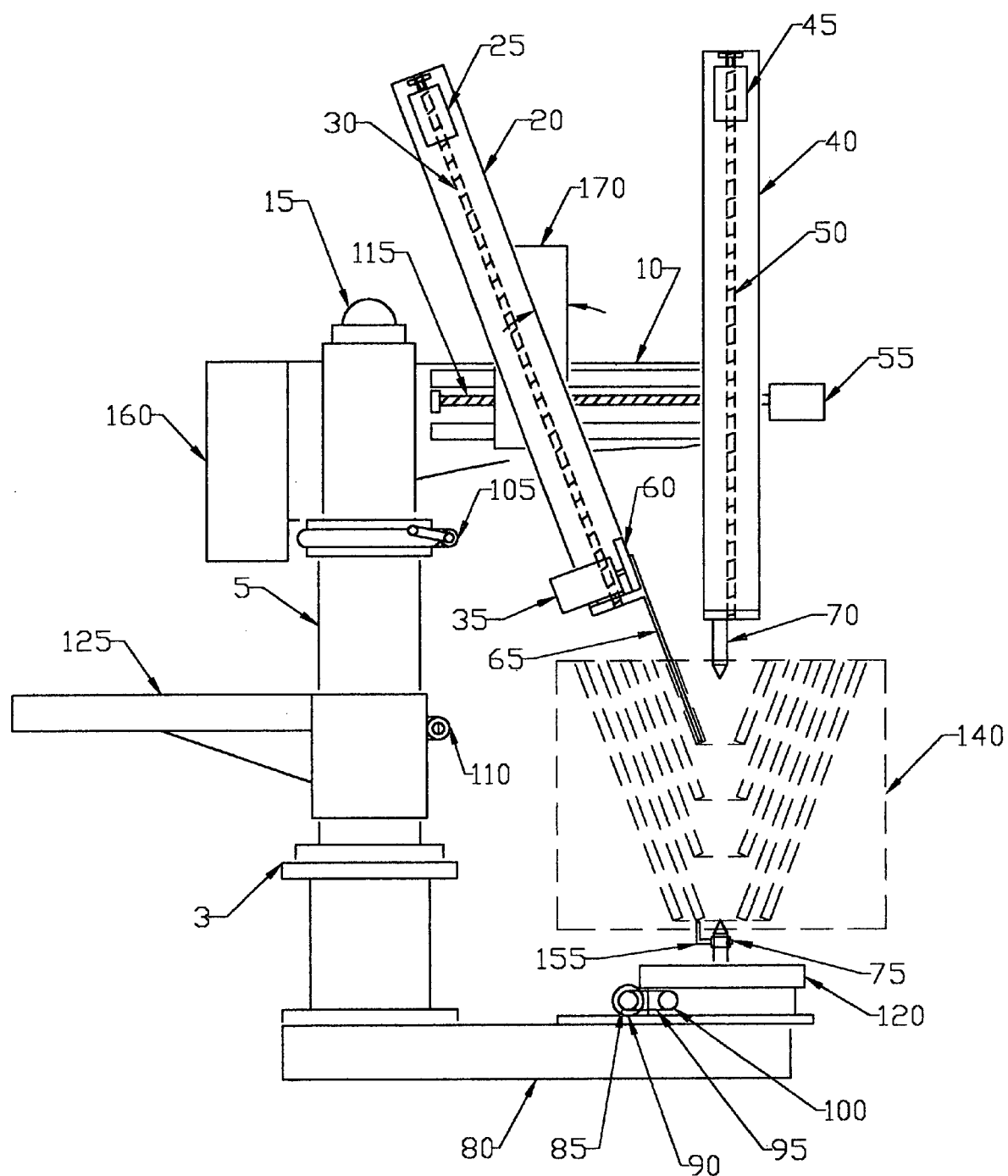
FIG. 4—is another frontal view of the vertically oriented embodiment of the invention illustrating pivoting of a cutting assembly.

Referring to FIG. 4, an alternate embodiment of the invention is shown which illustrates a pivotal cutting assembly 20. The pivotal cutting assembly 20 allows concentric conical cuts to be made by the chain saw blade assembly 65 in the object 140. Rotation of the object 140 is provided by a drive dog 155 mounted on the drive spindle 75. The maximum amount of pivoting 170 of the cutting assembly 20 is limited by the placement of the vertical conduit 5. A maximum of 75° from vertical center is envisioned.

Figure 5:
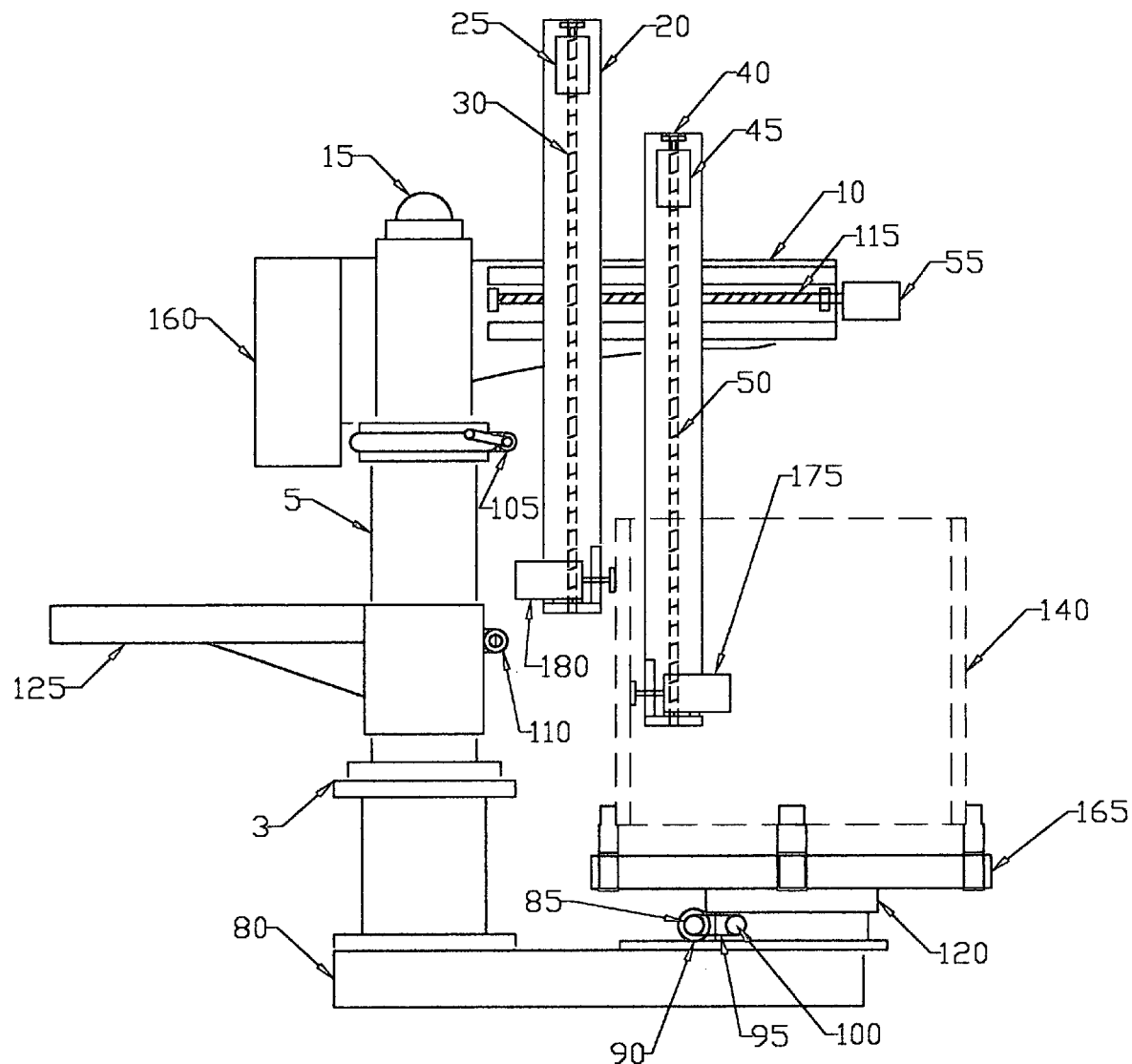
FIG. 5—is another frontal view of the vertically oriented embodiment of the invention illustrating replacement of the cutting assembly with another finishing assembly.

Referring to FIG. 5, another embodiment of the invention is shown where the chain saw 35 and the tailstock spindle 70 have been replaced with other cutting, grinding, or finishing tools 175, 180. This embodiment of the invention provides greater flexibility in completing an object 140 to a desired finish. In this embodiment of the invention, a multi-jawed chuck 165 is attached to the rotary table 120 and is used to hold the near finished object 140.

Figure 6:
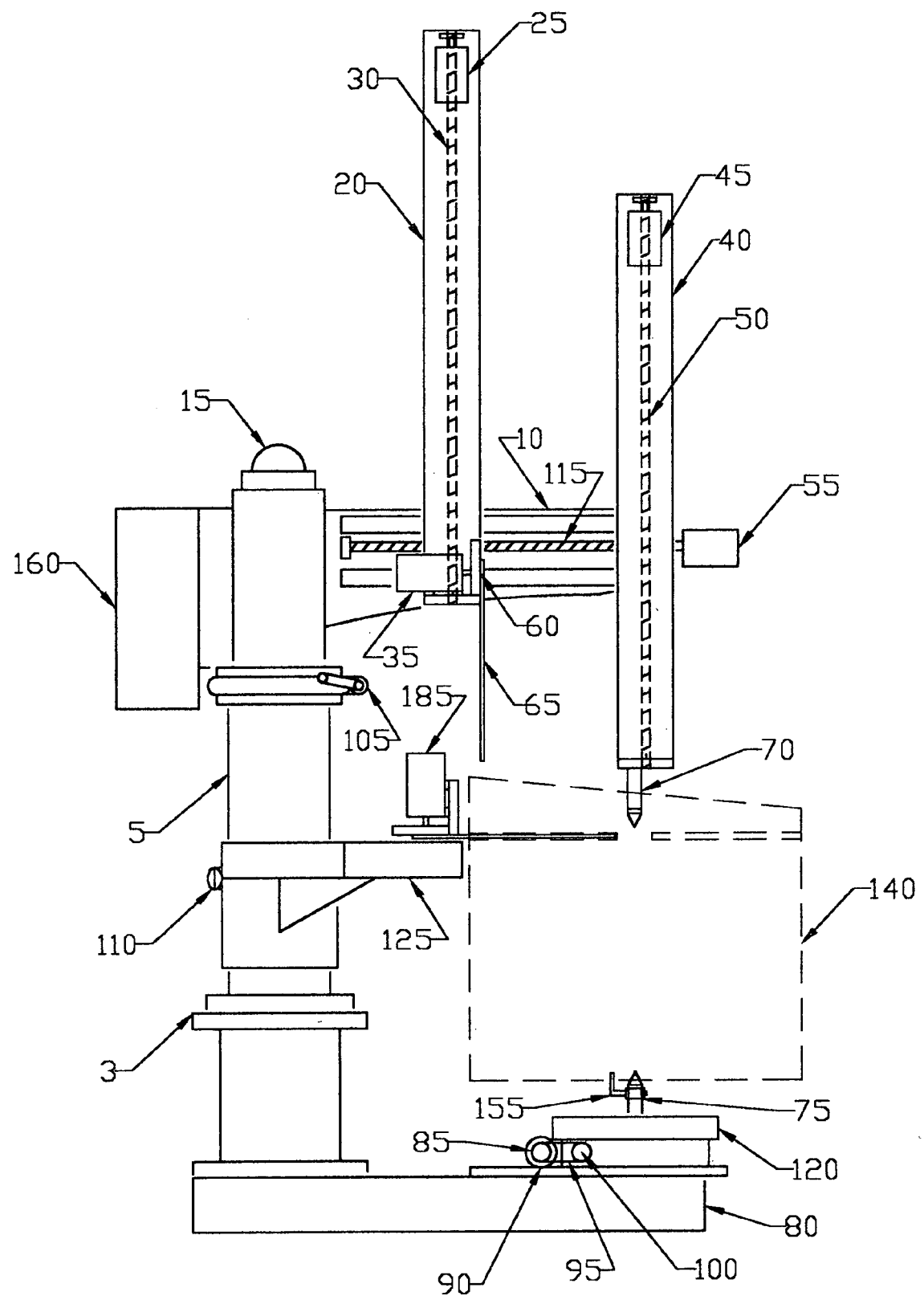
FIG. 6—is another frontal view of the vertically oriented embodiment of the invention illustrating use of an accessory table.

Referring to FIG. 6, another embodiment of the invention is shown where a second chain saw 185 is mounted on the accessory table 125. In this embodiment of invention, the second horizontally oriented chain saw 185 is being used to square one of the ends of the object 140. Other cutting, grinding, or finishing equipment may be mounted on the accessory table 125 as well, depending on the needs of the operator.

Figure 7:
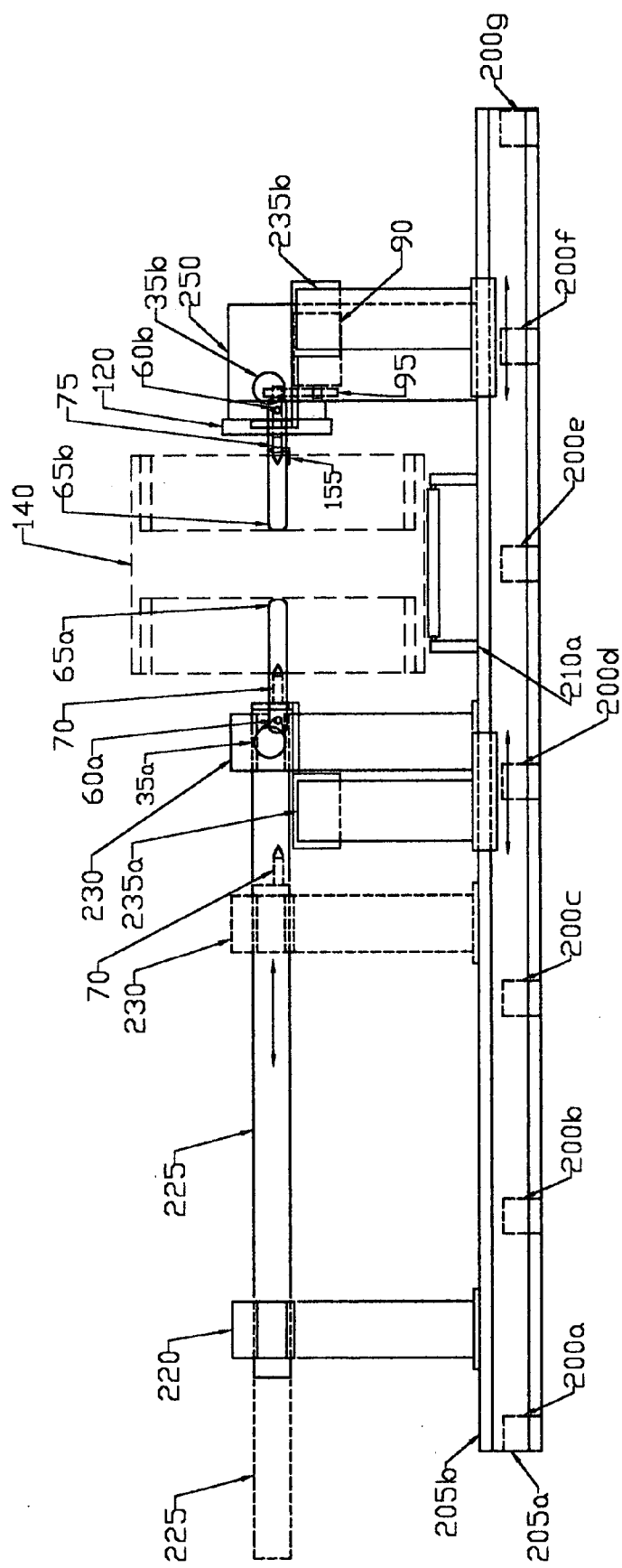
FIG. 7—is a frontal view of a horizontally oriented embodiment of the invention.

Referring to FIG. 7, a front view of a horizontally oriented embodiment of the invention is shown. The horizontal embodiment of invention resembles a large industrial lathe and is likewise constructed of industrial-strength metals. The horizontal embodiment of the invention allows greater lengthwise cutting of an object 140 than is reasonably afforded by the vertical embodiment of the invention. The horizontal embodiment of invention comprises a pair of parallel, horizontally aligned metal rails 205a, 205b secured together by periodically spaced metal cross beams 200a, 200b, 200c, 200d, 200e, 200f, 200g.

Slidably mounted on the inside rail 205a, is at least one traveling cutting assembly 235a. The traveling cutting assembly 235a comprises an electrically driven chain saw 35a in which the chain saw blade assembly 65a engages the object 140 generally in parallel with the horizontal rails 205a, 205b. However, in this embodiment of the invention, the chain saw 35a may be rotated a full 180°, via a pivoting bracket 60a, since there are no obstructions to interfere with the positioning of the chain saw 35a as is the case with the vertical embodiment of invention.

The chain saw 35a and chain saw blade assembly 65a are repositionable in three dimensions, including; vertically repositionable along a long vertical axis of the traveling cutting assembly 235a, inwardly repositionable along a long inward axis of the traveling cutting assembly 235a and horizontally repositionable by sliding the entire traveling cutting assembly 235a to a desired position on the horizontal rail 205a. A set of repositionable roller supports 210a, 210b (shown in FIG. 8) are provided on both horizontal rails 205a, 205b for supporting a heavy object 140 to be cut. In another horizontal embodiment of the invention, a second traveling cutting assembly 235b is provided which allows cutting of the object 140 from either or both ends of the object 140.

The second traveling cutting assembly 235b comprises a second electrically driven chain saw 35b and chain saw blade assembly 65b which may likewise be rotated through a full 180° via another pivoting bracket 60b and repositioned in three dimensions analogous to the first traveling cutting assembly 235a. On the outer horizontal rail 205b, a traveling tailstock assembly 230 is provided which slidably supports a center beam 225 having an integrated tailstock spindle 70. The tailstock spindle 70 is aligned in parallel to the horizontal rails 205a, 205b and engages one end of the object 140 to be cut at approximately its centerline. The tailstock spindle 70 is vertically repositionable along a long vertical axis of the traveling tailstock assembly 230 and traveling horizontal support assembly 220 and inwardly repositionable along a long inward axis of the traveling tailstock assembly 230 and traveling horizontal support assembly 220. The traveling tailstock assembly 230 is horizontally repositionable by sliding the entire traveling tailstock assembly 230 and traveling horizontal support assembly 220 to a desired position on the outer horizontal rail 205b.

A traveling drive assembly 250 is provided on the outer horizontal rail 205b. The traveling drive assembly 250 comprises an electrically driven variable speed motor 90 coupled by belt drive or chain 95 to vertically aligned drive table 120. The drive table 120 incorporates a drive spindle 75. In an embodiment of the invention, the drive spindle 75 includes a drive dog 155 for rotating the object 140 and is aligned in opposition to the tailstock spindle 70. The drive spindle 75 is aligned in parallel to the horizontal rails 205a, 205b and engages an opposite end of the object 140 along a common centerline axis with the tailstock spindle 70. The drive spindle 75 is vertically repositionable along a long vertical axis of the traveling drive assembly 250 and inwardly repositionable along a long inward axis of the traveling drive assembly 250.

In an embodiment of the invention, the traveling drive assembly 250 is horizontally repositionable by sliding the entire traveling drive assembly 250 to a desired position on the outer horizontal rail 205b. In another embodiment of the invention, the drive assembly 250 is fixed in position and centered between the horizontal rails 205a, 205b. In an alternate embodiment of the invention, a traveling horizontal support assembly 220 may be provided on the outer horizontal rail 205b which incorporates a center beam 225 having the tailstock spindle 70 mounted on and end thereto. In this embodiment of the invention, the center beam 225 passes through the traveling horizontal support assembly 220 and traveling tailstock assembly 230 to engage the object 140. This embodiment of the invention allows for the removal of longer cylindrical cuts obtained from the object 140. The traveling horizontal support assembly 220 is identically repositionable as the traveling tailstock assembly 230 and tailstock spindle 70.

Figure 8:
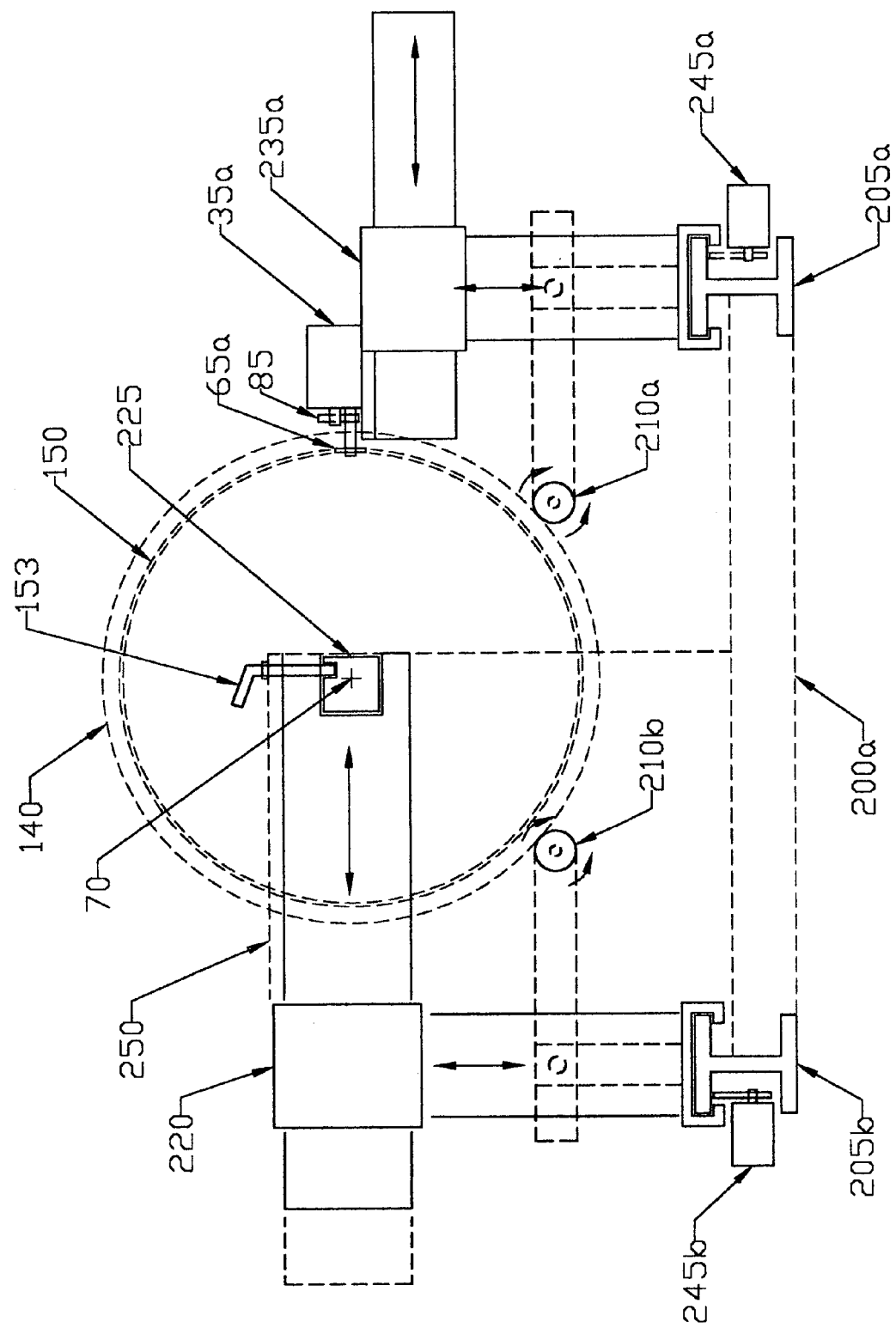
FIG. 8—is an end view of the horizontally oriented embodiment of the invention.

Referring to FIG. 8, an end view of the horizontal embodiment of invention is shown. This end view of the invention illustrates the variable positioning geometry available to the first and second traveling cutting assemblies 235a, 235b and roller supports 210a, 210b. The traveling tailstock assembly 230 and traveling horizontal support assembly 220 incorporate the same variable positioning geometry (not shown.) A hand operated clamp 153 is shown which maintains the center beam 225 and tailstock spindle 70 in position against the object being cut. In an alternate embodiment of invention, horizontal movement of the traveling cutting assemblies 235a, 235b and roller supports 210a, 210b along the horizontal rails 205a, 205b is accomplished by two or more electrically driven gear drives 245a, 245b.

Figure 9:
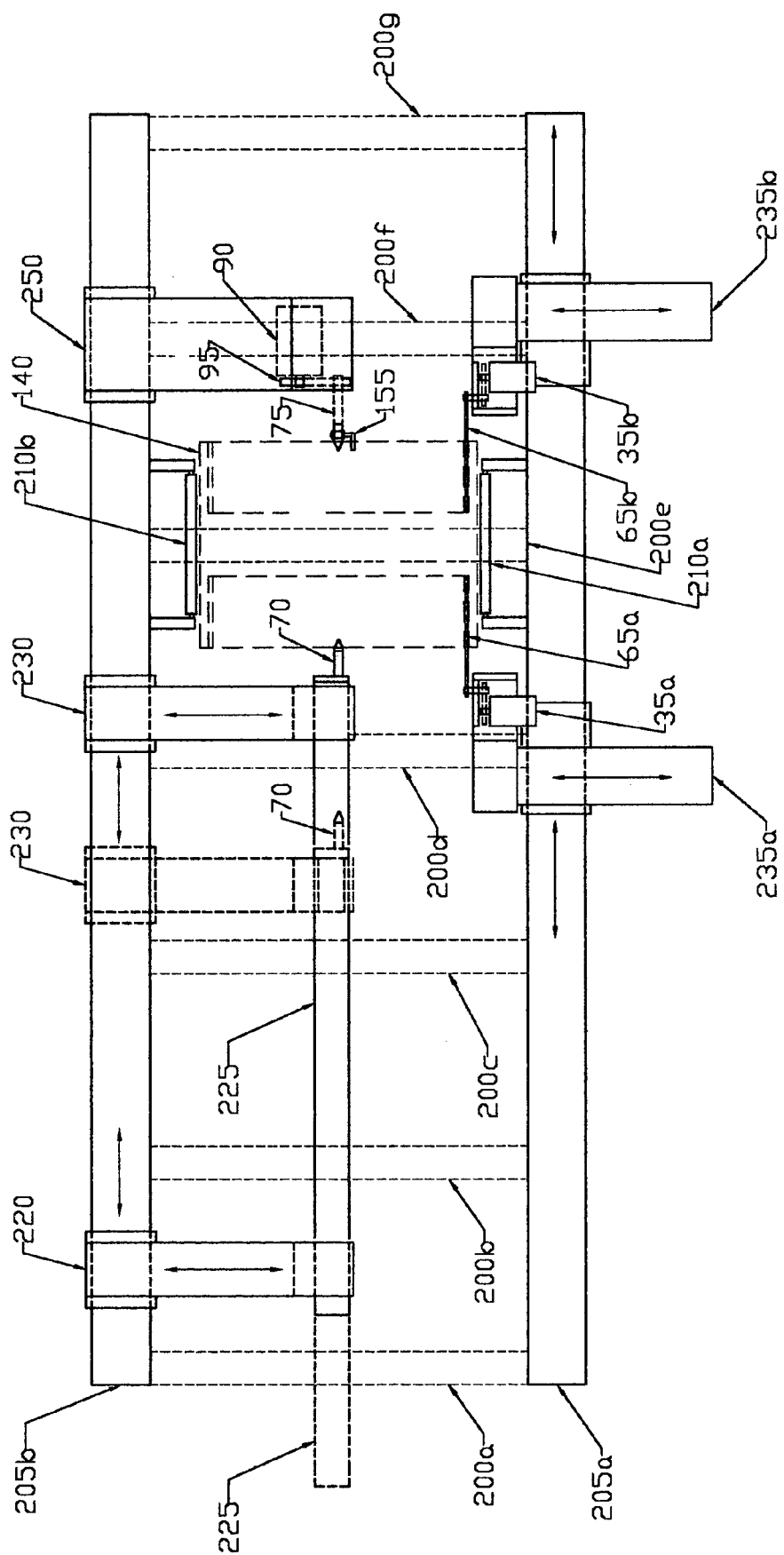
FIG. 9—is a top view of the horizontally oriented embodiment of the invention.

Referring to FIG. 9, a top view of the horizontal embodiment of the invention is shown. This top view illustrates the positioning of the various traveling assemblies 220, 230, 250, 235a, 235b and roller supports 210a, 210b during cutting operations of the object 140. A top view of the major components described in FIG. 7 is shown as well.

The foregoing described embodiments of the invention are provided as illustrations and descriptions. They are not intended to limit the invention to any one precise form described. In particular, it is contemplated that functional implementation of the invention described herein may be implemented using manual repositioning of the cutting, rotational and drive assemblies. In addition, gasoline powered chain saws may be employed as an alternative to the electrically driven chains saws described herein. No specific limitation is intended to a particular type of object or construction material is intended. Other variations and embodiments are possible in light of above teachings, and it is not intended that this Detailed Description limit the scope of invention, but rather by the claims following herein.

What is claimed:

1. A concentric coaxial cutting machine comprising:
   a longitudinal support member;
   a transverse support member coupled to said longitudinal support member including;
   a headstock member including;
      a headstock spindle member coupled to said headstock member including;
         a drive spindle rotationally mounted to said headstock spindle member and aligned to rotationally retain one end of an object to be concentrically cut;
   a tailstock member coupled to said longitudinal support member including;
      a tailstock spindle member coupled to said tailstock member including;
         a tailstock spindle rotationally mounted to said tailstock spindle member and aligned to retain an opposite end of said object;
   a drive assembly in rotational communication with at least said drive spindle and configured to rotate said drive spindle about a common longitudinal axis with said tailstock spindle;
   a first chain saw variably align-able at an angle to said common longitudinal axis such that said chain saw engages said object from at least said opposite end; and,
   wherein said tailstock spindle member is pivotally connected to said longitudinal support member so as to be repositionable about a long dimension of said longitudinal support member.

2. The concentric coaxial cutting machine according to claim 1 further comprising a repositionable accessory table transversely coupled to said longitudinal support member wherein said accessory table includes means for supporting additional cutting, roughing or finishing equipment.

3. The concentric coaxial cutting machine according to claim 1 wherein said headstock member is repositionable with respect to a long dimension of said longitudinal support member.

4. The concentric coaxial cutting machine according to claim 1 wherein said tailstock spindle member is repositionable along a long dimension of said tailstock member.

5. The concentric coaxial cutting machine according to claim 1 wherein said tailstock member is laterally repositionable with respect to said longitudinal support member.

6. The concentric coaxial cutting machine according to claim 1 wherein said first chain saw is pivotally coupled to said tailstock member.

7. The concentric coaxial cutting machine according to claim 6 wherein said first chain saw is laterally repositionable with respect to said longitudinal support member.

8. The concentric coaxial cutting machine according to claim 6 wherein said first chain saw is perpendicularly repositionable relative to said transverse support member.

9. The concentric coaxial cutting machine according to claim 1 wherein said longitudinal support member comprises an elongated conduit.

10. The concentric coaxial cutting machine according to claim 9 wherein said transverse support member comprises a transverse base coupled to one end of said elongated conduit.

11. The concentric coaxial cutting machine according to claim 10 wherein said headstock spindle member comprises a rotary table coupled to said transverse base and having said drive spindle centered thereon.

12. The concentric coaxial cutting machine according to claim 11 wherein said rotary table includes an attachable multi-jawed chuck.

13. The concentric coaxial cutting machine according to claim 9 wherein said tailstock member is rotationally repositionable about a radius of said elongated conduit.

14. The concentric coaxial cutting machine according to claim 1 wherein said tailstock member is longitudinally repositionable along a substantial length of said longitudinal support member.

15. The concentric coaxial cutting machine according to claim 1 wherein said first chain saw is repositionable by a plurality of jackscrew drives in repositionable communication with said first chain saw.

16. The concentric coaxial cutting machine according to claim 1 wherein said first chain saw is replaceable with one of: another cutting tool, a grinding tool and a finishing tool.

17. The concentric coaxial cutting machine according to claim 1 wherein said tailstock spindle member is repositionable by a plurality of jackscrew drives in repositionable communication with said tailstock spindle member.

18. The concentric coaxial cutting machine according to claim 1 wherein said angle is an acute angle relative to said common longitudinal axis.

19. The concentric coaxial cutting machine according to claim 1 further comprising a second chain saw mounted to an accessory table at an angle to said common axis.

20. The concentric coaxial cutting machine according to claim 19 wherein said transverse support member includes a centerline and the headstock spindle member is repositionable relative to the longitudinal support member along the centerline of the transverse support member.

21. The concentric coaxial cutting machine according to claim 20 wherein said first chain saw is variably coupled to said tailstock member.

22. The concentric coaxial cutting machine according to claim 1 wherein said headstock member and said tailstock member are slidable relative to said longitudinal support member.

23. The concentric coaxial cutting machine according to claim 1 wherein said tailstock spindle further includes a drive dog.

24. The concentric coaxial cutting machine according to claim 1 wherein said drive assembly includes;
- a variable speed electric motor having a first pulley coupled to a shaft associated with said variable speed electric motor;
- a second pulley is at least coupled to said drive spindle; and,
- a drive belt in rotational communication with said first and said second pulleys.

25. The concentric coaxial cutting machine according to claim 1 wherein said object to be concentrically cut includes one of; wood, ice and plastic.

* * * * *